US00RE41282E

(19) United States
(12) Reissued Patent
Uwazumi et al.

(10) Patent Number: US RE41,282 E
(45) Date of Reissued Patent: *Apr. 27, 2010

(54) PERPENDICULAR MAGNETIC RECORDING MEDIUM AND A METHOD OF MANUFACTURING THE SAME

(75) Inventors: Hiroyuki Uwazumi, Nagano (JP); Yasushi Sakai, Nagano (JP); Tadaaki Oikawa, Nagano (JP); Miyabi Nakamura, Nagano (JP)

(73) Assignee: Fuji Electric Device Technology Co., Ltd. (JP)

( * ) Notice: This patent is subject to a terminal disclaimer.

(21) Appl. No.: 11/945,854

(22) Filed: Nov. 27, 2007

Related U.S. Patent Documents

Reissue of:
(64) Patent No.: 7,067,206
Issued: Jun. 27, 2006
Appl. No.: 10/227,622
Filed: Aug. 23, 2002

(30) Foreign Application Priority Data

Aug. 31, 2001 (JP) ..... 2001-264517

(51) Int. Cl.
*G11B 5/71* (2006.01)
*G11B 5/66* (2006.01)
C23C 20/00

(52) U.S. Cl. ..... 428/831.2; 360/135; 427/131

(58) Field of Classification Search ..... 428/831, 428/831.2, 839; 360/135, 136; 156/278; 427/131
See application file for complete search history.

(56) References Cited

U.S. PATENT DOCUMENTS 4,722,869 A 2/1988 Honda et al.
5,049,451 A 9/1991 Lal et al.

(Continued)

FOREIGN PATENT DOCUMENTS

EP 0287280 A2 10/1988
JP 63-201913 A 8/1988

(Continued)

OTHER PUBLICATIONS

Search and Examination Report (Austrian Patent Office) for corresponding Singagpore Patent Application No. 200207316–1 dated Dec. 21, 2005; 10 pages.

Japanese Office Action dated May 12, 2006 for Japanese Patent Application JP2001–374897 corresponding to related US Patent 7,147,942.

Japanese Office Action dated May 2, 2006 for Japanese Patent Application JP2002–009160 corresponding to related US Patent 7,183,011.

Specification and drawings of related co–pending U.S. patent application U.S. Appl. No. 12/245,317, filed Oct. 3, 2008. "Perpendicular Magnetic Recording Medium and Method of Manufacturing the Same and Product Thereof", Hiroyuki Uwazumi et al.; pp. 1–14.

(Continued)

*Primary Examiner*—D. Lawrence Tarazano
*Assistant Examiner*—Louis Falasco
(74) *Attorney, Agent, or Firm*—Rossi, Kimms & McDowell LLP

(57) ABSTRACT

A perpendicular magnetic recording medium has a granular magnetic layer and a nonmagnetic underlayer of a metal or an alloy having a hexagonal close packed (hcp) crystal structure. A seed layer of a metal or an alloy of a face-centered cubic (fcc) crystal structure is provided under the nonmagnetic underlayer. Such a perpendicular magnetic recording medium exhibits excellent magnetic characteristics even when the thickness of the underlayer or the total thickness of the underlayer and the seed layer is very thin. Excellent magnetic characteristics can be obtained even when of the substrate is not preheated. Accordingly, a nonmagnetic substrate, such as a plastic resin can be employed to reduce the manufacturing cost.

20 Claims, 2 Drawing Sheets

U.S. PATENT DOCUMENTS

| | | | | |
|---|---|---|---|---|
| 5,679,473 | A | | 10/1997 | Murayama et al. |
| 5,736,232 | A | * | 4/1998 | Shih et al. ..... 428/611 |
| 5,736,262 | A | | 4/1998 | Ohkijima et al. |
| 5,815,342 | A | | 9/1998 | Akiyama et al. |
| 5,900,323 | A | | 5/1999 | Okamoto et al. |
| 5,981,039 | A | | 11/1999 | Isono et al. |
| 5,981,084 | A | | 11/1999 | Riabkov et al. |
| 6,086,974 | A | | 7/2000 | Thiele et al. |
| 6,110,582 | A | | 8/2000 | Wu et al. |
| 6,132,863 | A | | 10/2000 | Song et al. |
| 6,183,893 | B1 | | 2/2001 | Futamoto et al. |
| 6,221,481 | B1 | | 4/2001 | Wu et al. |
| 6,248,416 | B1 | | 6/2001 | Lambeth et al. |
| 6,416,839 | B1 | | 7/2002 | Xuan et al. |
| 6,447,936 | B1 | | 9/2002 | Futamoto et al. |
| 6,524,724 | B1 | | 2/2003 | Cheng et al. |
| 6,589,669 | B2 | | 7/2003 | Uwazumi et al. |
| 6,602,620 | B1 | | 8/2003 | Kikitsu et al. |
| 6,638,648 | B2 | | 10/2003 | Yamamoto et al. |
| 6,667,116 | B1 | | 12/2003 | Uwazumi et al. |
| 6,682,826 | B2 | | 1/2004 | Shimizu et al. |
| 6,716,543 | B2 | | 4/2004 | Uwazumi et al. |
| 6,767,651 | B2 | | 7/2004 | Uwazumi et al. |
| 6,794,028 | B2 | | 9/2004 | Uwazumi et al. |
| 6,884,520 | B2 | | 4/2005 | Oikawa et al. |
| 7,147,942 | B2 | | 12/2006 | Uwazumi et al. |
| 7,183,011 | B2 | | 2/2007 | Nakamura et al. |
| 7,247,395 | B2 | | 7/2007 | Nakamura et al. |
| 2001/0012573 | A1 | | 8/2001 | Kaitsu et al. |
| 2001/0027868 | A1 | | 10/2001 | Carisella |
| 2001/0036564 | A1 | | 11/2001 | Ohmori |
| 2001/0038932 | A1 | | 11/2001 | Uwazumi et al. |
| 2002/0018917 | A1 | | 2/2002 | Sakai et al. |
| 2002/0058159 | A1 | | 5/2002 | Kubota et al. |
| 2002/0058160 | A1 | | 5/2002 | OIkawa et al. |
| 2003/0049495 | A1 | | 3/2003 | Sakai et al. |
| 2003/0064249 | A1 | | 4/2003 | Uwazumi et al. |
| 2003/0064253 | A1 | * | 4/2003 | Uwazumi et al. ..... 428/831 |
| 2003/0138671 | A1 | | 7/2003 | Tadakki et al. |
| 2003/0152809 | A1 | | 8/2003 | Oikawa et al. |
| 2003/0157375 | A1 | | 8/2003 | Uwazumi et al. |
| 2003/0170501 | A1 | | 9/2003 | Akira |
| 2003/0235718 | A1 | * | 12/2003 | Watanabe et al. ..... 428/831 |
| 2004/0000374 | A1 | * | 1/2004 | Watanabe et al. ..... 156/278 |
| 2004/0027868 | A1 | | 2/2004 | Nakamura et al. |
| 2004/0043258 | A1 | | 3/2004 | Yamamoto et al. |
| 2007/0059561 | A1 | | 3/2007 | Uwazumi et al. |
| 2007/0082231 | A1 | | 4/2007 | Nakamura et al. |

FOREIGN PATENT DOCUMENTS

| | | | |
|---|---|---|---|
| JP | 2-227814 | A | 9/1990 |
| JP | 02-287918 | A | 11/1990 |
| JP | 08-083418 | A | 3/1996 |
| JP | 08-255342 | A | 10/1996 |
| JP | 11-134634 | A | 5/1999 |
| JP | 11-213371 | A | 8/1999 |
| JP | 2000-082210 | A | 3/2000 |
| JP | 2000-123345 | A | 4/2000 |
| JP | 2000-306231 | A | 11/2000 |
| JP | 2000-322726 | A | 11/2000 |
| JP | 2001-283427 | A | 10/2001 |
| JP | 2002-025031 | A | 1/2002 |
| JP | 2003-077122 | A | 3/2003 |
| JP | 2003-0178412 | A | 6/2003 |
| WO | 99/24973 | A1 | 5/1999 |

OTHER PUBLICATIONS

Oikawa et al.; "High Performance CoPtCrO Single Layered Perpendicular Media with No Recording Demagnetization"; IEEE; vol. 36; pp. 2393–2395; Tokyo Japan.

Patent No. US RE37,748 Chen et al.–Withdrawn.

Notice of Reasons of Rejection issued in corresponding Japanese Patent Appllication No. 2001–264517 dated Jan. 26, 2010, Abridged English Translation provided.

"High Performance CoPtCrO Single Layered Perpendicular Media with No Recording Demagnetization", Oikawa et al.:IEEE TRansactions on Magnetics, vol. 36, No. 5; Sep. 2000; pp. 2393–2395.

* cited by examiner

PERPENDICULAR MAGNETIC RECORDING MEDIUM AND A METHOD OF MANUFACTURING THE SAME

Matter enclosed in heavy brackets [ ] appears in the original patent but forms no part of this reissue specification; matter printed in italics indicates the additions made by reissue.

BACKGROUND

As a technique for achieving a high density magnetic recording, a perpendicular magnetic recording has been targeted as an alternative to a conventional longitudinal magnetic recording. In a magnetic recording layer of a perpendicular magnetic recording medium, a crystalline film of CoCr alloy having a hexagonal close packed (hcp) crystal structure principally has been studied. To make a perpendicular magnetic recording possible, the crystal alignment is controlled so that the c-axis of each crystal grain is perpendicular to the film surface, i.e., the c-plane parallel to the film surface. For addressing a higher recording density in a perpendicular magnetic recording medium, attempts have been made to minimize the grain size and to reduce the dispersion of the grain size of the CoCr alloy composing the magnetic recording layer, and to reduce magnetic interaction between crystal grains.

A technique has been proposed to achieve a high density recording in a longitudinal magnetic recording medium by reducing magnetic interaction between crystal grains, in which a layer of nonmagnetic and non-metallic substance such as oxide or nitride, is formed at the grain boundary of a crystal grain composing a magnetic recording layer. This magnetic layer is called "a granular magnetic layer," and disclosed in Japanese Unexamined Patent Application Publication Hei 8-255342 and U.S. Pat. No. 5,679,473, for example. The magnetic grains in the granular magnetic layer are three dimensionally isolated with each other by the nonmagnetic and non-metallic grain boundary. Since magnetic interaction between magnetic grains decreases, "zigzag domain wall" in the transition region of a recording bit is suppressed, which is considered to result in noise reduction.

On this background, the use of the granular magnetic layer has been proposed in the magnetic recording layer of a perpendicular magnetic recording medium. For example, IEEE Trans. Mag., vol. 36, p. 2393 (2000) discloses a perpendicular magnetic recording medium that comprises an underlayer of ruthenium (Ru) and a magnetic layer of a CoPtCrO alloy having a granular structure. The document shows that the c-axis alignment of crystal grains composing the magnetic layer enhances as the ruthenium underlayer becomes thicker, bringing about improvement in magnetic characteristics and electromagnetic conversion performances of the magnetic recording layer. However, the thickness of the ruthenium (Ru) underlayer of at least 40 nm is necessary to obtain a granular perpendicular magnetic recording medium that exhibits excellent characteristics.

A so-called double-layered perpendicular magnetic recording medium has been proposed, where a soft magnetic backing layer is provided under the magnetic recording layer to enhance sharpness of the magnetic field produced at the head position. To achieve a high density recording in a magnetic recording medium with this structure, it is considered essential that the thickness of the nonmagnetic layer provided between the magnetic recording layer and the soft magnetic layer be 20 nm or thinner. This places a restriction on the magnetic recording medium. Even in a structure without the soft magnetic backing layer, it is desirable for the thickness of the ruthenium underlayer to be thin from the viewpoint of reducing the manufacturing cost since ruthenium is an expensive rare metallic element.

Accordingly, there is a need for a perpendicular magnetic recording medium that exhibits excellent magnetic characteristics and superior electromagnetic conversion performance at a low cost. The present invention addresses this need.

SUMMARY OF THE INVENTION

The present invention relates to a perpendicular magnetic recording medium and a method of manufacturing the recording medium. In particular, the present invention relates to a perpendicular magnetic recording medium that can be mounted on an external memory of a computer or other magnetic recording apparatus, and to a method of manufacturing such a recording medium.

According to one aspect of the present invention, a perpendicular magnetic recording medium has a nonmagnetic substrate, and at least a seed layer, a nonmagnetic underlayer, a magnetic layer, and a protective film sequentially laminated on the substrate. The magnetic layer can be composed of ferromagnetic crystal grains and nonmagnetic grain boundaries mainly composed of oxide. The nonmagnetic underlayer can be composed of a metal or an alloy having a hexagonal close packed (hcp) crystal structure. The seed layer can be composed of a metal or an alloy having a face-centered cubic (fcc) crystal structure. The nonmagnetic substrate can be composed of a plastic resin.

The hexagonal close packed (hcp) crystal structure composing the nonmagnetic underlayer can control the crystal alignment of the granular magnetic layer. The metal composing the nonmagnetic underlayer can be selected from Ti, Re, Ru, and Os, and the alloy composing the nonmagnetic underlayer can contains at least one element selected from Ti, Re, Ru, and Os.

The face-centered cubic (fcc) crystal structure composing the seed layer can control the crystal alignment of the underlayer. The metal composing the seed layer can be selected from Cu, Au, Pd, Pt, and Ir. The alloy composing the seed layer can contain at least an element selected from Cu, Au, Pd, Pt, and Ir, or can contain at least Ni and Fe.

A nonmagnetic alignment control layer can be further provided between the seed layer and the nonmagnetic substrate. The nonmagnetic alignment control layer can be composed of a metal or an alloy that has a body-centered cubic (bcc) crystal structure or an amorphous structure. The metal composing the nonmagnetic alignment control layer can be selected from Nb, Mo, Ta, and W. The alloy composing the nonmagnetic alloy can contain at least one element selected from Nb, Mo, Ta, and W. A material having an amorphous structure such as NiP or CoZr also can be used.

According to another aspect of the present invention, a method of manufacturing a perpendicular magnetic recording medium comprises the steps of depositing the layers and the film of the perpendicular magnetic recording medium described above. Each of the steps of depositing these layers and the film can be carried out while the temperature of the nonmagnetic substrate is lower than 80° C. or without preheating the nonmagnetic substrate.

DETAILED DESCRIPTION

Now, the preferred embodiments of the present invention will be described with reference to the accompanying drawings.

Figure 1:
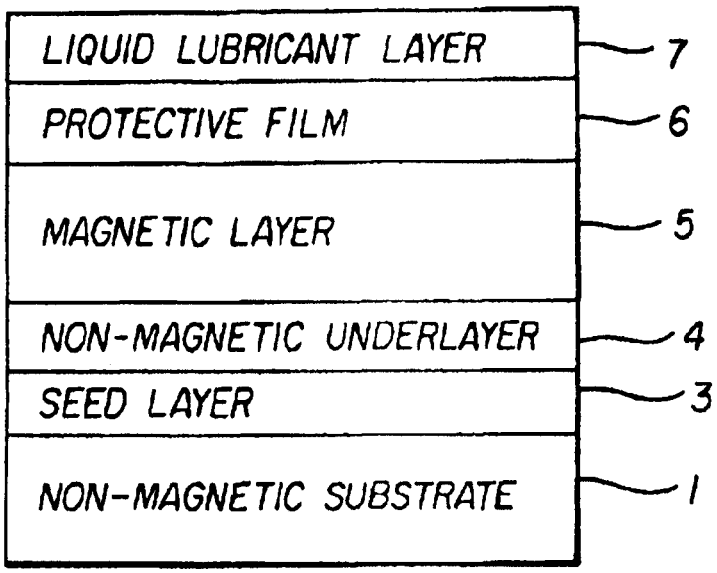
FIG. 1 schematically illustrates a cross-sectional view of a structure of an embodiment of a perpendicular magnetic recording medium according to the present invention.

Referring to FIG. 1, a perpendicular magnetic recording medium of the present invention includes a nonmagnetic substrate 1 and a seed layer 3, a nonmagnetic underlayer 4, a magnetic layer 5, and a protective film 6 laminated in this order on the nonmagnetic substrate 1. The protective film 6 is coated with a liquid lubricant layer 7.

Figure 2:
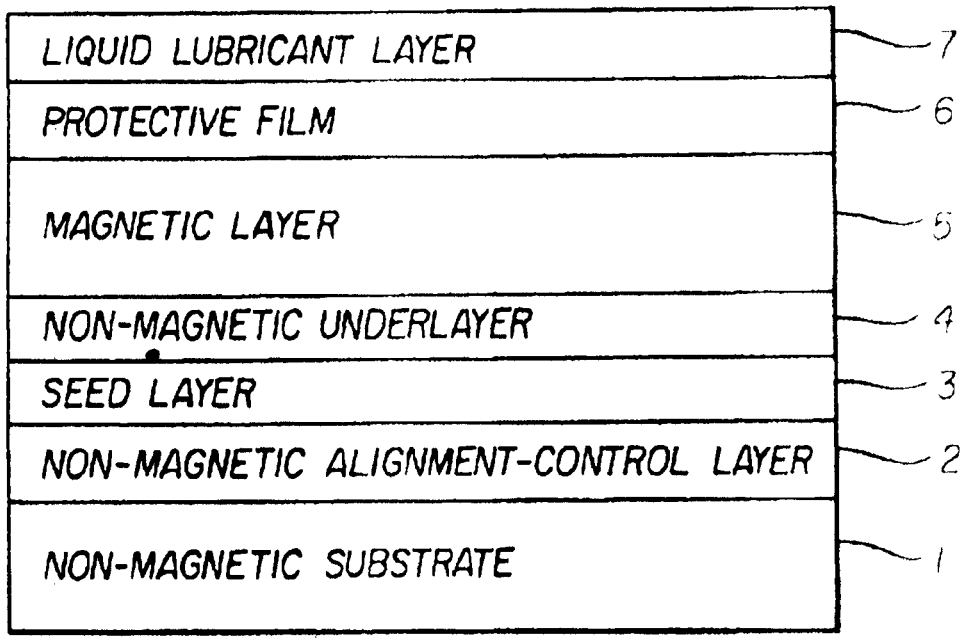
FIG. 2 schematically illustrates a cross-sectional view similar to FIG. 1, but illustrates another embodiment of a perpendicular magnetic recording medium according to the present invention.

FIG. 2 is an embodiment similar to the embodiment of FIG. 1, but includes a nonmagnetic alignment control layer 2 between the nonmagnetic substrate 1 and the seed layer 3

In both embodiments, the nonmagnetic substrate 1 can be formed of NiP-plated aluminum alloy, strengthened glass, or crystallized glass, which are conventionally used in a substrate of a typical magnetic recording medium. When substrate heating is unnecessary, a plastic substrate made by injection molding of a plastic resin, such as polycarbonate or polyolefin, can be used.

The magnetic layer 5 is a so-called granular magnetic layer. This layer has ferromagnetic crystal grains, between which nonmagnetic grain boundaries are formed of nonmagnetic metal oxide or metal nitride. The magnetic layer 5 with such a structure can be deposited by sputtering a ferromagnetic metallic target containing the oxide or nitride that constructs the grain boundary. Alternatively, the magnetic layer can be deposited by reactive sputtering a ferromagnetic metallic target under an argon gas atmosphere containing oxygen or nitrogen.

While the material for laminating the ferromagnetic crystals is not limited to a specific material, an alloy of CoPt system is preferable. To reduce recording media noise, in particular, it is preferable to add at least one element selected from Cr, Ni, and Ta to the CoPt alloy. To form a stable granular structure, it is preferable to form nonmagnetic grain boundaries using an oxide of at least one element selected from Cr, Co, Si, Al, Ti, Ta, Hf, and Zr. The magnetic layer 5 should have some thickness to allow sufficient head regeneration output and achieve a desired recording resolution.

The protective film 6 can be a thin film composed mainly of carbon, for example. The liquid lubricant layer 7 can be composed of a perfluoropolyether lubricant, for example.

The nonmagnetic underlayer 4 is composed of a metal or an alloy having a hexagonal close packed (hcp) crystal structure. To control the crystal alignment of the granular magnetic layer 5, the nonmagnetic underlayer 4 can be composed of a metal selected from Ti, Re, Ru, and Os, or an alloy containing at least one element selected from Ti, Re, Ru, and Os.

The seed layer 3 is composed of a metal or an alloy having a face-centered cubic (fcc) crystal structure. The seed layer 3 can be composed of a metal selected from Cu, Au, Pd, Pt, and Ir, an alloy containing at least one element selected from Cu, Au, Pd, Pt, and Ir, or an alloy containing at least Ni and Fe. When the seed layer 3 having an fcc crystal structure is laminated on a nonmagnetic substrate 1, the (111) plane that is the closest-packed plane of the fcc crystal structure tends to align parallel to the film surface. The crystal grains of the nonmagnetic underlayer 4 growing on the crystal grains of the seed layer 3 aligned in the (111) plane have a tendency to grow so as to minimize the strain energy due to lattice mismatch between the crystal grain of the underlayer 4 and the crystal grain of the seed layer 3. As a result, the hcp (002) plane of the nonmagnetic underlayer 4 tends to align parallel to the film surface.

When a granular magnetic layer 5 is laminated on the nonmagnetic underlayer 4 in this crystal alignment condition, the metal crystal grains of the magnetic layer 5 having the hcp crystal structure also tends to grow with their (002) plane aligning parallel to the film surface. This leads to a perpendicular magnetic recording medium having an excellent magnetic characteristic.

The lattice matching between the seed layer 3 and the nonmagnetic underlayer 4 and the lattice matching between the nonmagnetic underlayer 4 and the granular magnetic layer 5 are favorable if the materials of the seed layer 3 and the nonmagnetic underlayer 4 are appropriately chosen from the materials listed below. The preferable materials for the seed layer 3 include a metal selected from Cu, Au, Pd, Pt, and Ir, an alloy containing at least one element selected from Cu, Au, Pd, Pt, and Ir, and an alloy containing at least Ni and Fe. The preferable materials for the nonmagnetic underlayer 4 include a metal selected from Ti, Re, Ru, and Os, and an alloy containing at least an element selected from Ti, Re, Ru, and Os. A perpendicular magnetic recording medium using these materials exhibits a superior magnetic characteristic.

The thickness of the seed layer 3 can be at least 3 nm, more preferably 5 nm or more to control the crystal orientation of the nonmagnetic underlayer 4. In a double-layered perpendicular magnetic recording medium with a soft magnetic backing layer provided under the seed layer 3 in particular, the seed layer is desirable to be as thin as possible insofar as the crystal alignment of the nonmagnetic underlayer 4 is possible to be controlled, because the magnetic layer and the soft magnetic backing layer are preferably designed to be closely positioned with each other.

The thickness of the nonmagnetic underlayer 4 can be at least 2 nm, preferably 5 nm or more to control the crystal orientation of the granular magnetic layer 5. The underlayer 4 is desirable to be as thin as possible to reduce the manufacturing cost and for proximity of the magnetic layer and the soft magnetic backing layer in a double-layered perpendicular magnetic recording medium insofar as control of the crystal orientation of the granular magnetic layer 5 is possible.

In manufacturing a double-layered perpendicular magnetic recording medium, the soft magnetic backing layer can be composed of a NiFe soft magnetic alloy having a fcc structure, or a NiFe soft magnetic alloy layer having an fcc structure with a minimum thickness can be provided just over the soft magnetic backing layer. The control of the crystal orientation of the nonmagnetic underlayer 4 is possible regarding this NiFe soft magnetic alloy layer as a seed layer 3. The distance between the magnetic layer and the soft magnetic backing layer in this case is substantially equal to the thickness of the nonmagnetic underlayer 4. Thus, by making the underlayer thin, superior characteristics can be achieved in the perpendicular magnetic recording medium.

The nonmagnetic alignment control layer 2 is composed of a metal or an alloy having a body centered cubic (bcc)

crystal structure or an amorphous structure. By providing a nonmagnetic alignment control layer 2 having this structure, the tendency to align in (111) plane is more pronounced in the crystal grain of the seed layer 3 having the fcc crystal structure. Thus, the crystal alignment of the nonmagnetic underlayer 4 can be enhanced, resulting in improvement of the magnetic characteristics of the magnetic layer.

This effect of the alignment control layer is most significant when the material having the bcc structure is a nonmagnetic metal selected from Nb, Mo, Ta, and W, or a nonmagnetic alloy containing at least one element selected from Nb, Mo, Ta, and W. A material having an amorphous structure such as NiP or CoZr can also be employed.

The thickness of the nonmagnetic alignment control layer 2 can be at least 3 nm, more preferably 5 nm or more for controlling the crystal alignment of the seed layer 3.

According to the present method of manufacturing a perpendicular magnetic recording medium, the deposition processes can be conducted at temperatures lower than 80° C., so that the substrate 1 need not be preheated, which is commonly done in the conventional process of manufacturing a magnetic recording medium. A perpendicular magnetic recording medium according to the invention having the structure shown in FIG. 1 or 2 exhibits excellent characteristics even if the substrate preheating step is omitted. Consequently, the production process can be simplified by omitting the substrate preheating step, to reduce the manufacturing cost. Omitting the substrate preheating step also allows use of a nonmagnetic substrate made of a molded plastic resin, such as polycarbonate or polyolefin.

The following describes specific examples of embodiments of the present invention. The examples are merely for illustrating a spirit of the invention, not to limit the scope of the present invention.

In Example 1, the nonmagnetic substrate 1 is a polycarbonate substrate of 3.5" disk made by injection molding. The substrate 1 was cleaned and introduced into a sputtering apparatus. Without preheating the substrate 1, a platinum seed layer 3 having a thickness of 5 nm was deposited under an argon gas pressure of 5 mTorr. Subsequently, a nonmagnetic underlayer 4 of ruthenium having a thickness in the range from 0 to 40 nm was deposited under an argon gas pressure of 5 mTorr. Then, a granular magnetic layer 5 having a thickness of 30 nm was deposited by an RF sputtering method using a target of $Co_{78}$ $Cr_{12}$ $Pt_{12}$ with the addition of 10 mol % $SiO_2$ under an argon gas pressure of 5 mTorr. After depositing a carbon protective film having a thickness of 10 nm on the granular magnetic layer, the resulting substrate was taken out from the sputtering apparatus and coated with a liquid lubricant to a thickness of 1.5 nm. Thus, a perpendicular magnetic recording medium having the structure shown in FIG. 1 was produced.

Figure 3:
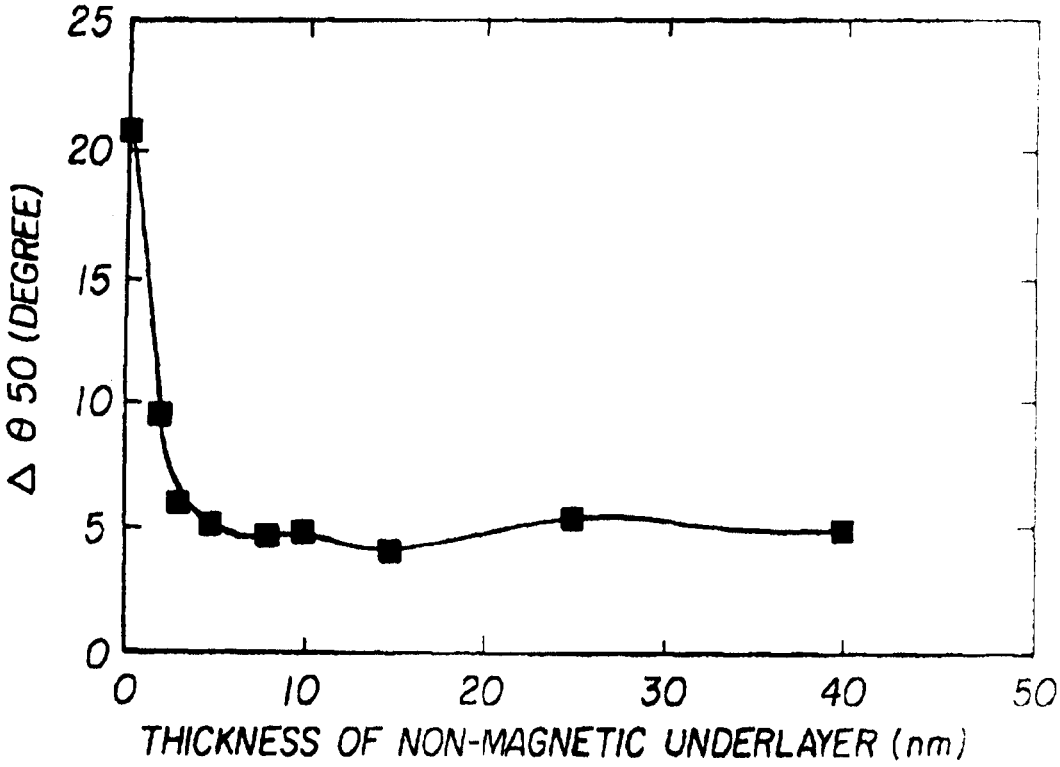
FIG. 3 is a graph for illustrating the relationship between $\Delta\theta_{50}$ value and the thickness of the nonmagnetic underlayer, in which $\Delta\theta_{50}$ is a half-width of a rocking curve of hcp (002) plane of the CoCrPt magnetic layer obtained by an X-ray diffraction method.

FIG. 3 is a graph illustrating the crystal alignment of the magnetic layer 5 obtained by an X-ray diffraction method. The abscissa represents the thickness of the nonmagnetic underlayer 4, and the ordinate represents $\Delta\theta_{50}$, which is a half-width of a rocking curve taken for (002) plane of the CoCrPt magnetic layer having a hcp structure. Accordingly, a smaller $\Delta\theta_{50}$ value in FIG. 3 means a stronger (002) plane alignment in the plane of the CoCrPt magnetic layer.

The $\Delta\theta_{50}$ value is about 20° when the magnetic layer 5 is laminated without a nonmagnetic underlayer 4 on the seed layer 3, that is, when the nonmagnetic underlayer thickness is zero nm in FIG. 3. However, the $\Delta\theta_{50}$ value abruptly drops as the thickness of the nonmagnetic underlayer 4 laminated on the seed layer 3 increases. The $\Delta\theta_{50}$ value decreases to about 6° at 3 nm thickness and about 5° at 5 nm thickness. The $\Delta\theta_{50}$ value does not significantly change even if the thickness of the nonmagnetic underlayer is increased over 5 nm. This result implies that the thickness of the nonmagnetic underlayer is favorably at least 3 at nm, more preferably at 5 nm or more, to control the crystal alignment of the magnetic layer.

In Example 2, a set of perpendicular magnetic recording media having the structure shown in FIG. 1 was produced using various materials for the nonmagnetic underlayer 4. The conditions in the laminating processes were the same as those in Example 1, except that the thickness of the nonmagnetic underlayer was maintained at 5 nm. Table 1 summarizes the materials of the nonmagnetic underlayer 4, crystal structure of the underlayer 4, coercive force Hc, squareness ratio S, and $\Delta\theta_{50}$ value of the thus produced set of perpendicular magnetic recording media. The $\Delta\theta_{50}$ value is a half-width of a rocking curve of the diffraction line of hcp (002) plane of the CoCrPt magnetic layer. The coercive force Hc and the squareness ratio S were measured using a vibrating sample magnetometer VSM applying a magnetic field perpendicular to the film surface. Table 1 also shows evaluation results for a perpendicular magnetic recording medium having a nonmagnetic underlayer composed of Ta or Cr with a bcc structure, for comparison.

TABLE 1

| Material of underlayer | Crystal structure of underlayer | Hc (Oe) | Squareness ratio (S) | $\Delta\theta_{50}$ (degree) |
|---|---|---|---|---|
| Ru | hcp | 3020 | 0.99 | 5.1 |
| Re | hcp | 3430 | 0.95 | 4.8 |
| Os | hcp | 2980 | 0.92 | 5.9 |
| Ti | hcp | 2440 | 0.89 | 7.2 |
| Ru—20% W | hcp | 3310 | 0.98 | 4.3 |
| Ti—10% Cr | hcp | 2560 | 0.91 | 7.0 |
| Ta | bcc | 820 | 0.22 | 22.9 |
| Cr | bcc | 590 | 0.35 | 19.3 |

Excellent magnetic characteristics have been demonstrated in both the coercive force Hc and the squareness ratio S when the materials having the hcp structure were used for the nonmagnetic underlayer as compared with the case where Ta or Cr having a bcc structure was used for the nonmagnetic underlayer. The $\Delta\theta_{50}$ values are suppressed to low values, which indicate a strong (002) plane alignment in the plane of the magnetic layer.

In Example 3, a set of magnetic recording media having the structure shown in FIG. 1 was produced by laminating a seed layer 3 using various materials. The conditions in the laminating processes were the same as those in Example 1, except that the nonmagnetic underlayer was formed of ruthenium with a 5 nm thickness. Table 2 summarizes the materials of the seed layer 3, crystal structure of the seed layer, coercive force Hc, squareness ratio S, and $\Delta\theta_{50}$ value of the thus produced set of perpendicular magnetic recording media. The $\Delta\theta_{50}$ value is a half-width of a rocking curve of the diffraction line of hcp (002) plane of the CoCrPt magnetic layer. Table 2 also shows evaluation results for a perpendicular magnetic recording medium having a seed layer of Ta or Cr with a bcc structure, for comparison.

TABLE 2

| Material of seed layer | Crystal structure of seed layer | Hc (Oe) | Squareness ratio (S) | $\Delta\theta_{50}$ (degree) |
|---|---|---|---|---|
| Cu | fcc | 2780 | 0.89 | 4.3 |
| Au | fcc | 2990 | 0.92 | 5.9 |
| Pd | fcc | 3120 | 0.98 | 4.9 |
| Pt | fcc | 3020 | 0.99 | 5.1 |
| Ir | fcc | 3350 | 0.88 | 6.8 |
| Cu—10% Au | fcc | 2880 | 0.90 | 5.3 |
| Ni—15% Fe—30% Cu | fcc | 3070 | 0.93 | 6.6 |
| Ta | bcc | 2310 | 0.67 | 11.5 |
| Cr | bcc | 1270 | 0.36 | 18.9 |

Excellent magnetic characteristics have been demonstrated in both the coercive force Hc and the squareness ratio S when the materials having an fcc structure were used for the seed layer as compared with the case where Ta or Cr having a bcc structure was used for the seed layer. The $\Delta\theta_{50}$ values are suppressed to low values, which indicate a strong (002) plane alignment in the plane of the magnetic layer.

In Example 4, a set of magnetic recording media having the structure shown in FIG. 2 was produced by sequentially laminating a nonmagnetic alignment control layer 2 having a thickness of 5 nm using various materials, a seed layer having a thickness of 5 nm, and a nonmagnetic underlayer of a 5 nm thickness. Other conditions were the same as those in Example 1. Table 3 summarizes the material of the nonmagnetic alignment control layer, crystal structure of the nonmagnetic alignment control layer, coercive force Hc, squareness ratio S, and $\Delta\theta_{50}$ value of the thus produced set of perpendicular magnetic recording media. The $\Delta\theta_{50}$ value is a half-width of a rocking curve of the diffraction line of hcp (002) plane of the CoCrPt magnetic layer. Table 3 also shows evaluation results for a perpendicular magnetic recording medium having a nonmagnetic alignment control layer made of Cu with an fcc structure or Ru with a hcp structure, for comparison.

TABLE 3

| Material of alignment control layer | Crystal structure | Hc (Oe) | Squareness ratio (S) | $\Delta\epsilon_{50}$ (degree) |
|---|---|---|---|---|
| Nb | bcc | 3350 | 0.97 | 4.0 |
| Ta | bcc | 3410 | 0.98 | 4.1 |
| Mo | bcc | 3210 | 0.94 | 4.9 |
| W | bcc | 3600 | 0.98 | 3.8 |
| Ni—20% P | amorphous | 3380 | 0.99 | 4.6 |
| Cu | fcc | 2110 | 0.55 | 9.8 |
| Ru | hcp | 850 | 0.21 | 15.2 |

Excellent magnetic characteristics have been demonstrated in both the coercive force Hc and the squareness ratio S when the materials having a bcc structure or an amorphous structure were used for the nonmagnetic alignment control layer as compared with the case where the material having an fcc or hcp structure was used for the nonmagnetic alignment control layer. The $\Delta\theta_{50}$ values are suppressed to low values, which indicate a strong (002) plane alignment in the plane of the magnetic layer.

In the perpendicular magnetic recording medium according to the present invention, the nonmagnetic underlayer is composed of a metal or an alloy having a hexagonal close packed (hcp) crystal structure, and the seed layer is composed of a metal or an alloy having a face-centered cubic (fcc) crystal structure under the nonmagnetic underlayer. Such a perpendicular magnetic recording medium exhibits excellent magnetic characteristics even when the thickness of the underlayer is small or the total thickness of the underlayer and the seed layer is small.

By providing a nonmagnetic alignment control layer of a metal or an alloy having a body-centered cubic (bcc) structure or an amorphous structure beneath the seed layer, the crystal alignment of the seed layer can be enhanced, resulting in enhancement of the crystal alignment of the magnetic layer, as well. Employing such intermediate layers provides a perpendicular magnetic recording medium exhibiting excellent magnetic characteristics. Besides, the substrate preheating step can be omitted from a manufacturing process, which allows the use of an inexpensive plastic substrate.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-264517, in its entirety, including the drawings, claims, and the specification thereof, is incorporated herein by reference.

What is claimed is:

1. A perpendicular magnetic recording medium comprising:

a nonmagnetic substrate; and at least a seed layer, a nonmagnetic underlayer, a magnetic layer, and a protective film sequentially laminated on said substrate, wherein said magnetic layer is composed of ferromagnetic crystal grains and nonmagnetic grain boundaries mainly composed of [silicon oxide] *an oxide of at least one member selected from the group consisting of Cr, Co, Si, Al, Ti, Ta, Hf and Zr*, wherein said nonmagnetic underlayer is composed of a metal or an alloy having a hexagonal close packed crystal structure wherein said metal is selected from a group consisting of Re, Ru, and Os, and said alloy composing said nonmagnetic underlayer contains at least one element selected from a group consisting of Re, Ru, and Os, and wherein the seed layer is composed of a metal or an alloy having a face-centered cubic crystal structure.

2. A perpendicular magnetic recording medium according to claim 1, wherein said metal composing said seed layer is selected from a group consisting of Cu, Au, Pd, Pt, and Ir, and said alloy composing said seed layer contains at least one element selected from a group consisting of Cu, Au, Pd, Pt, and Ir, or contains at least Ni and Fe.

3. A perpendicular magnetic recording medium according to claim 1, further comprising a nonmagnetic alignment-control layer disposed between said seed layer and said nonmagnetic substrate, said alignment control layer being composed of a metal or an alloy that has a body-centered cubic crystal structure or an amorphous structure.

4. A perpendicular magnetic recording medium according to claim 3, wherein said metal composing said alignment-control layer is selected from a group consisting of Nb, Mo, Ta, and W, and said alloy composing said alignment-control layer contains at least one element selected from a group consisting of Nb, Mo, Ta, and W.

5. A perpendicular magnetic recording medium according to claim 1, wherein said nonmagnetic substrate is composed of a plastic resin.

6. A perpendicular magnetic recording medium according to claim 3, wherein said nonmagnetic substrate is composed of a plastic resin.

7. A perpendicular magnetic recording medium according to claim 1, wherein said underlayer is at least 2 nm thick.

8. A perpendicular magnetic recording medium according to claim 1, wherein said underlayer is at least 5 nm thick.

9. A perpendicular magnetic recording medium according to claim 7, wherein said seed layer is at least 3 nm thick.

10. A perpendicular magnetic recording medium according to claim 7, wherein said underlayer is at least 5 nm thick.

11. A perpendicular magnetic recording medium according to claim 8, wherein said seed layer is at least 3 nm thick.

12. A perpendicular magnetic recording medium according to claim 8, wherein said underlayer is at least 5 nm thick.

13. A method of manufacturing perpendicular magnetic recording medium comprising a nonmagnetic substrate and at least a seed layer, a nonmagnetic underlayer, a magnetic layer, and a protective film sequentially laminated on said substrate, wherein said magnetic layer is composed of ferromagnetic crystal grains and nonmagnetic grain boundaries mainly composed of [silicon oxide] *an oxide of at least one member selected from the group consisting of Cr, Co, Si, Al, Ti, Ta, Hf and Zr*, wherein said nonmagnetic underlayer is composed of a metal or an alloy having a hexagonal close packed crystal structure, wherein said metal is selected from a group consisting of Re, Ru, and Os and said alloy composing said nonmagnetic underlayer contains at least one element selected from a group consisting of Re, Ru, and Os, and wherein the seed layer is composed of a metal or an alloy having a face-centered cubic crystal structure, the method comprising the steps of:

depositing the seed layer on the nonmagnetic substrate;

depositing the nonmagnetic underlayer on said seed layer;

depositing the magnetic layer on said underlayer; and depositing the protective film on said magnetic layer.

14. A method of manufacturing a perpendicular magnetic recording medium according to claim 13, wherein each of said depositing steps is conducted while a temperature of said substrate is lower than 80° C.

15. A method of manufacturing a perpendicular magnetic recording medium according to claim 13, wherein each of said depositing steps is conducted without preheating said nonmagnetic substrate.

16. A method of manufacturing a perpendicular magnetic recording medium according to claim 13, further comprising the step of depositing a nonmagnetic alignment-control layer composed of a metal or an alloy having a body-centered cubic crystal structure or an amorphous structure on said nonmagnetic substrate before depositing said seed layer.

17. A method of manufacturing a perpendicular magnetic recording medium according to claim 16, wherein each of said depositing steps is conducted while a temperature of said substrate is lower than 80° C.

18. A method of manufacturing a perpendicular magnetic recording medium according to claim 16, wherein each of said depositing steps is conducted without preheating said [nonmegnetic] *nonmagnetic* substrate.

*19. A perpendicular magnetic recording medium comprising: a nonmagnetic substrate; and at least a seed layer, a nonmagnetic underlayer, a magnetic layer, and a protective film sequentially laminated on said substrate, wherein said magnetic layer is composed of ferromagnetic crystal grains and nonmagnetic grain boundaries mainly composed of an oxide of at least one member selected from the group consisting of Si, Al, Ti, Ta, Hf and Zr, wherein said nonmagnetic underlayer is composed of a metal or an alloy having a hexagonal close packed crystal structure wherein said metal is selected from a group consisting of Re, Ru, and Os, and said alloy composing said nonmagnetic underlayer contains at least one element selected from a group consisting of Re, Ru, and Os, and wherein the seed layer is composed of a metal or an alloy having a face-centered cubic crystal structure.*

*20. A method of manufacturing a perpendicular magnetic recording medium comprising a nonmagnetic substrate and at least a seed layer, a nonmagnetic underlayer, a magnetic layer, and a protective film sequentially laminated on said substrate, wherein said magnetic layer is composed of ferromagnetic crystal grains and nonmagnetic grain boundaries mainly composed of an oxide of at least one member selected from the group consisting of Si, Al, Ti, Ta, Hf and Zr, wherein said nonmagnetic underlayer is composed of a metal or an alloy having a hexagonal close packed crystal structure, wherein said metal is selected from a group consisting of Re, Ru, and Os and said alloy composing said nonmagnetic underlayer contains at least one element selected from a group consisting of Re, Ru, and Os, and wherein the seed layer is composed of a metal or an alloy having a face-centered cubic crystal structure, the method comprising the steps of: depositing the seed layer on the nonmagnetic substrate; depositing the nonmagnetic underlayer on said seed layer; depositing the magnetic layer on said underlayer; and depositing the protective film on said magnetic layer.*

* * * * *